(12) United States Patent
Matsushita

(10) Patent No.: US 8,886,431 B2
(45) Date of Patent: Nov. 11, 2014

(54) APPARATUS AND METHOD FOR CONTROLLING A VEHICLE

(75) Inventor: Koki Matsushita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 196 days.

(21) Appl. No.: 13/521,328

(22) PCT Filed: Jan. 4, 2011

(86) PCT No.: PCT/IB2011/000003
§ 371 (c)(1),
(2), (4) Date: Jul. 10, 2012

(87) PCT Pub. No.: WO2011/086442
PCT Pub. Date: Jul. 21, 2011

(65) Prior Publication Data
US 2012/0296540 A1 Nov. 22, 2012

(30) Foreign Application Priority Data
Jan. 18, 2010 (JP) .................................. 2010-008535

(51) Int. Cl.
*G06F 7/70* (2006.01)
*B60K 26/02* (2006.01)
*F02D 11/02* (2006.01)
*B60T 8/172* (2006.01)

(52) U.S. Cl.
CPC .................. *B60K 26/02* (2013.01); *B60T 8/172* (2013.01); *B60W 2540/106* (2013.01); *F02D 11/02* (2013.01)
USPC ............................................. 701/70; 701/110

(58) Field of Classification Search
CPC ....................................................... B60T 8/172
USPC ..................................................... 701/70, 110
See application file for complete search history.

(56) References Cited

U.S. PATENT DOCUMENTS 6,309,031 B1 * 10/2001 Crombez et al. ............ 303/113.4
2002/0134602 A1 * 9/2002 Kobayashi et al. ............ 180/169
(Continued)

FOREIGN PATENT DOCUMENTS

DE 198 56 587 A1 6/1999
DE 102 55 724 A1 12/2003
(Continued)

OTHER PUBLICATIONS

"What control on a car causes a change in velocity", wiki.answers.com, all pages, date unknown.*

(Continued)

*Primary Examiner* — Calvin Cheung
(74) *Attorney, Agent, or Firm* — Oliff PLC

(57) ABSTRACT

In vehicle running control that, at the time of controlling driving force, determines whether an operating speed that is a speed at which a driver operates an accelerator operator (10) is higher than or equal to a threshold and that changes details of control over the driving force on the basis of a result of the determination, the threshold is set on the basis of operation information, other than the operating speed of the accelerator operator (10), within information related to operation of the accelerator operator (10). In the vehicle running control, at the time of controlling the driving force, details of control over the driving force are changed on the basis of the operating speed that is the speed at which the driver operates the accelerator operator (10) and a stroke amount that is an operation amount of the accelerator operator (10) when the driver has operated the accelerator operator (10).

9 Claims, 9 Drawing Sheets

(56) References Cited

U.S. PATENT DOCUMENTS

2003/0236608 A1* 12/2003 Egami .............................. 701/70
2008/0276750 A1* 11/2008 Kim et al. ....................... 74/513

FOREIGN PATENT DOCUMENTS

| | | |
|---|---|---|
| EP | 1 619 067 A2 | 1/2006 |
| JP | A-06-088561 | 3/1994 |
| JP | A-07-076267 | 3/1995 |
| JP | A-9-14021 | 1/1997 |
| JP | A-09-048340 | 2/1997 |
| JP | A-09-263234 | 10/1997 |
| JP | A-10-071945 | 3/1998 |
| JP | A-2000-291458 | 10/2000 |
| JP | A-2003-237421 | 8/2003 |

OTHER PUBLICATIONS

Jul. 26, 2011 International Search Report issued in International Patent Application No. PCT/IB2011/000003.

Jul. 26, 2011 Written Opinion issued in International Patent Application No. PCT/IB2011/000003.

\* cited by examiner

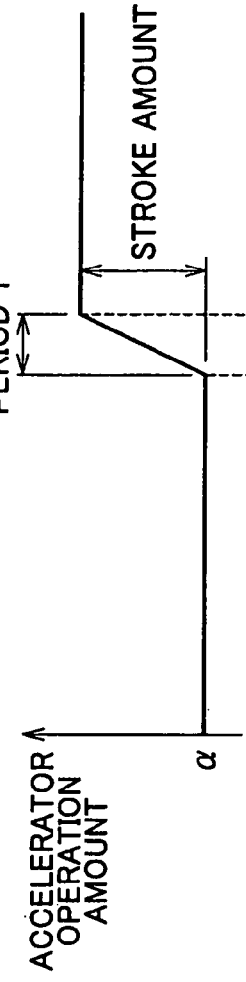
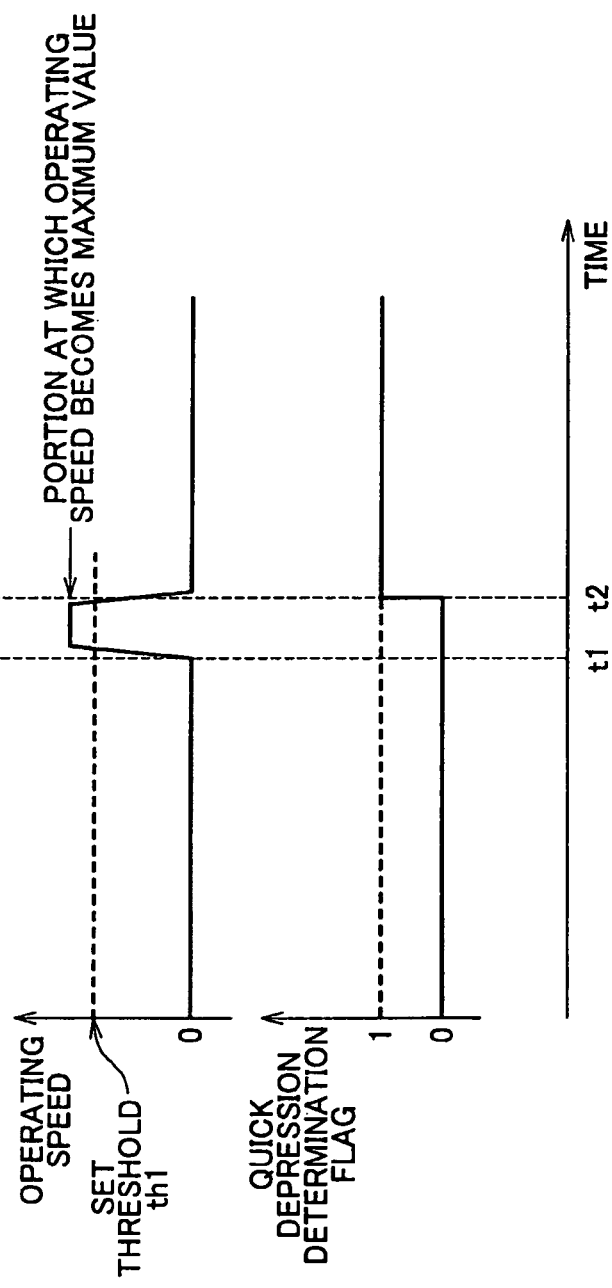

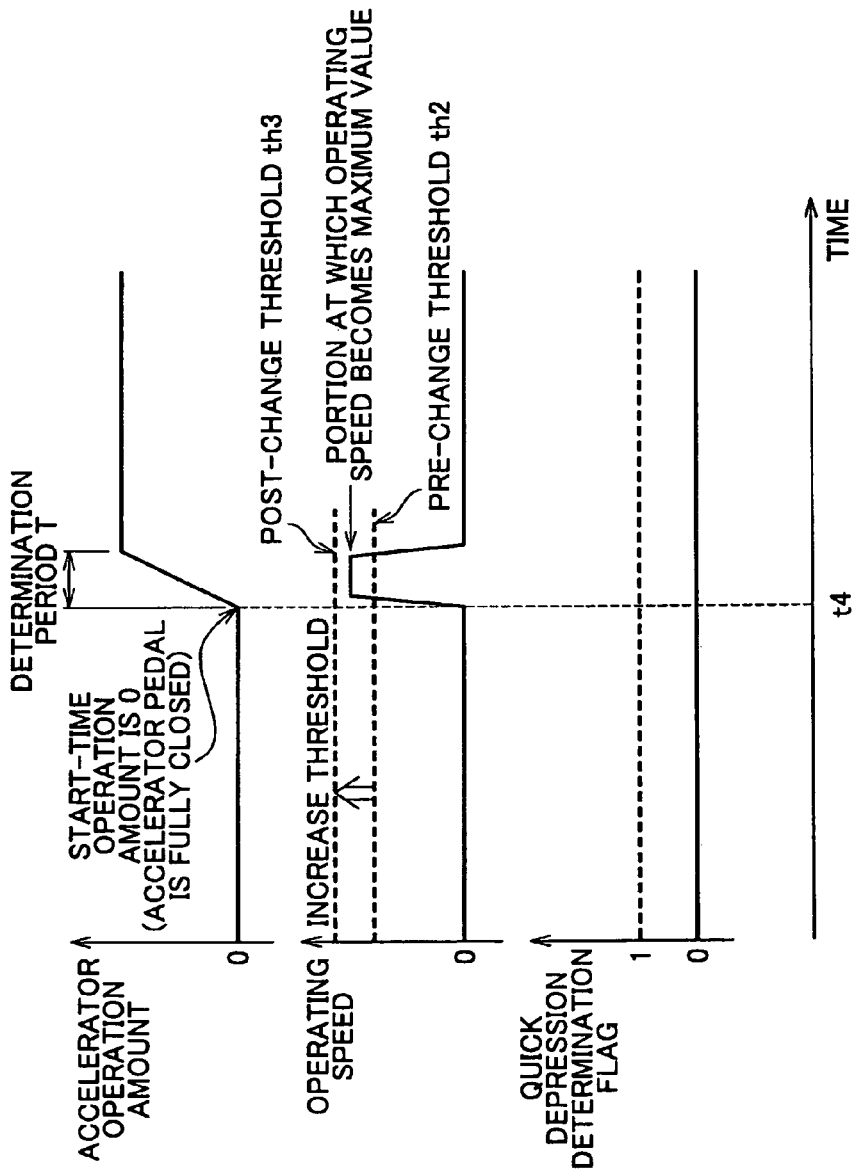

APPARATUS AND METHOD FOR CONTROLLING A VEHICLE

BACKGROUND OF THE INVENTION

1. Field of the Invention

The invention relates to a vehicle running control system and a vehicle running control method.

2. Description of the Related Art

A vehicle running control system is proposed as a control system that controls running of a vehicle, such as an automobile. The vehicle running control system changes running control for the vehicle to the one different from normal running control when a driver has quickly depressed or released an accelerator pedal.

There is such a vehicle running control system that varies driving force of the vehicle using a driving force control device on the basis of, for example, an operating speed that is a speed at which a driver operates an accelerator pedal. Specifically, when the driver has quickly depressed or quickly released the accelerator pedal, the vehicle running control system detects a relatively high accelerator pedal operating speed and then controls a power source, such as an engine, to generate driving force having a rate of change higher than a rate of change of driving force generated in normal operation control on the basis of the detected accelerator pedal operating speed. By so doing, when the driver has quickly depressed or quickly released the accelerator pedal, the vehicle running control system is, for example, able to accelerate or decelerate the vehicle at a rate higher than that of the vehicle that is controlled in normal operation control.

As a related art, there is, for example, proposed a vehicle driving force control system that controls driving force of a vehicle on the basis of a rate of change of an accelerator position, that is, an accelerator pedal operating speed (see Japanese Patent Application Publication No. 2003-237421 (JP-A-2003-237421)). The vehicle driving force control system described in JP-A-2003-237421 detects a vehicle speed, an accelerator position and a rate of change of an accelerator position to generate a vehicle speed control target driving force and an acceleration control target driving force, and, furthermore, adds the vehicle speed control target driving force and the acceleration control target driving force to generate a target driving force of the vehicle in response to a driver's request.

Incidentally, in general, when the driver operates the accelerator pedal, the accelerator pedal operating speed tends to vary with a stroke amount that is an amount by which the driver operates the accelerator pedal. Therefore, for example, even when the driver does not intend to quickly depress the accelerator pedal, when the driver depresses the accelerator pedal and then the stroke amount of the accelerator pedal becomes relatively large, the accelerator pedal operating speed also becomes relatively high, so large driving force tends to be generated with respect to driving force generated in normal operation control. That is, a driver's intention may not be reflected on running of the vehicle, so there is room for improvement to reflect a driver's intention on running of the vehicle when the driver has operated the accelerator pedal.

SUMMARY OF THE INVENTION

The invention provides a vehicle running control system and a vehicle running control method that are able to improve a reflection of a driver's intention on running of a vehicle when the driver has operated an accelerator operator.

A first aspect of the invention relates to a vehicle running control system that, at the time of controlling driving force, determines whether an operating speed that is a speed at which a driver operates an accelerator operator is higher than or equal to a threshold and that changes details of control over the driving force on the basis of a result of the determination. The vehicle running control system includes a threshold setting unit that sets the threshold on the basis of operation information, other than the operating speed of the accelerator operator, within information related to operation of the accelerator operator.

In the above vehicle running control system, the operation information may be a stroke amount that is an operation amount of the accelerator operator when the driver has operated the accelerator operator.

In the above vehicle running control system, the vehicle running control system may calculate an absolute value of a difference between an operation amount at a start of operation of the accelerator operator and an operation amount at an end of operation of the accelerator operator as the stroke amount, and the end of operation may be time at which a predetermined period of time has elapsed after the operating speed becomes a maximum value. In the above vehicle running control system, the threshold may be set to be larger as the stroke amount increases. In the above vehicle running control system, the vehicle running control system may calculate an absolute value of a difference between an operation amount at a start of operation of the accelerator operator and an operation amount at an end of operation of the accelerator operator as the stroke amount, and the end of operation may be time at which the operating speed has decreased by a predetermined speed after the operating speed becomes a maximum value. In the above vehicle running control system, the operation information may be an accelerator position when the driver starts operating the accelerator operator. In the above vehicle running control system, the vehicle running control system may determine whether the driver has quickly released the accelerator operator, and the operation information may be an accelerator position when the driver starts quickly releasing the accelerator operator.

In the above vehicle running control system, the operation information may be information as to whether the driver has operated the accelerator operator from a fully closed state when the driver starts operating the accelerator operator.

In the above vehicle running control system, when it is determined that the operating speed is higher than or equal to the threshold, the details of control over the driving force may be changed so that a rate of change of the driving force is increased as compared with a rate of change during normal times. In the above vehicle running control system, the vehicle running control system may determine whether the driver has quickly depressed the accelerator operator, and may determine whether the driver has quickly released the accelerator operator, when it is determined that the driver has quickly depressed the accelerator operator, the details of control over the driving force may be changed so that a target output value is increased with respect to a target output value during normal times, which is set in correspondence with the detected accelerator position, and, when it is determined that the driver has quickly released the accelerator operator, the details of control over the driving force may be changed so that the target output value is decreased with respect to the target output value during normal times.

A second aspect of the invention relates to a vehicle running control system. The vehicle running control system includes a control unit that, at the time of controlling driving force, changes details of control over the driving force on the basis of an operating speed that is a speed at which a driver operates an accelerator operator and a stroke amount that is an operation amount of the accelerator operator when the driver has operated the accelerator operator.

A third aspect of the invention relates to a vehicle running control method in which, at the time of controlling driving force, it is determined whether an operating speed that is a speed at which a driver operates an accelerator operator is higher than or equal to a threshold and that changes details of control over the driving force on the basis of a result of the determination. The control method includes setting the threshold on the basis of operation information, other than the operating speed of the accelerator operator, within information related to operation of the accelerator operator.

A fourth aspect of the invention relates to a vehicle running control method. The control method includes: at the time of controlling driving force, changing details of control over the driving force on the basis of an operating speed that is a speed at which a driver operates an accelerator operator and a stroke amount that is an operation amount of the accelerator operator when the driver has operated the accelerator operator.

According to the first and third aspects of the invention, when it is determined whether the operating speed of the accelerator operator is higher than or equal to the threshold, the threshold is changed on the basis of the operation information of the accelerator operator. That is, according to the first and third aspects of the invention, when it is determined whether the driver has quickly operated the accelerator operator, it is determined whether the operating speed of the accelerator operator is higher than or equal to the quick operation determination threshold that is changed on the basis of the operation information of the accelerator operator. By so doing, the first and third aspects of the invention are advantageously able to improve the accuracy of determination as to whether the driver has quickly operated the accelerator operator in comparison with, for example, a vehicle running control system that is configured to determine whether the driver has quickly operated the accelerator operator on the basis of only the operating speed of the accelerator operator. Here, the quick operation, for example, means that the driver quickly operates the accelerator operator as compared with during normal times on the basis of a driver's intention at the time of rapid acceleration, rapid deceleration, in caser of emergency, or the like. In addition, according to the first and third aspects, when it is determined whether the driver has quickly operated the accelerator operator, it is determined whether the operating speed of the accelerator operator is higher than or equal to the quick operation determination threshold that is changed on the basis of the operation information of the accelerator operator, so the first and third aspects of the invention change the details of control over the driving force on the basis of determination that changes on the basis of the operation information of the accelerator operator. By so doing, the first and third aspects of the invention are able to further accurately reflect a driver's intention on running control over the vehicle in comparison with, for example, a vehicle running control system that is configured to change the details of control over the driving force on the basis of only the operating speed of the accelerator operator. That is, the first and third aspects of the invention are advantageously able to improve a reflection of a driver's intention on running of the vehicle when the driver has operated the accelerator operator.

In addition, according to the second and fourth aspects of the invention, the driving force is controlled on the basis of the operating speed and stroke amount of the accelerator operator. By so doing, the second and fourth aspects of the invention are able to further accurately reflect a driver's intention on running control over the vehicle in comparison with, for example, a vehicle running control system that is configured to change the details of control over the driving force on the basis of only the operating speed of the accelerator operator. That is, the second and fourth aspects of the invention are advantageously able to improve a reflection of a driver's intention on running of the vehicle when the driver has operated the accelerator operator.

BRIEF DESCRIPTION OF THE DRAWINGS

The features, advantages, and technical and industrial significance of this invention will be described below with reference to the accompanying drawings, in which like numerals denote like elements, and wherein:

FIG. 3A to FIG. 3C are timing charts that show changes over time of accelerator position, accelerator pedal operating speed and quick depression determination flag according to the first embodiment of the invention;

FIG. 9A to FIG. 9C are timing charts that show changes over time of accelerator position, accelerator pedal operating speed and quick depression determination flag in a vehicle running control system according to a third embodiment of the invention.

DETAILED DESCRIPTION OF EMBODIMENTS

Hereinafter, embodiments of a vehicle running control system according to the invention will be descried in detail with reference to the accompanying drawings. Note that the following embodiments do not limit the invention.

First Embodiment

Figure 1:
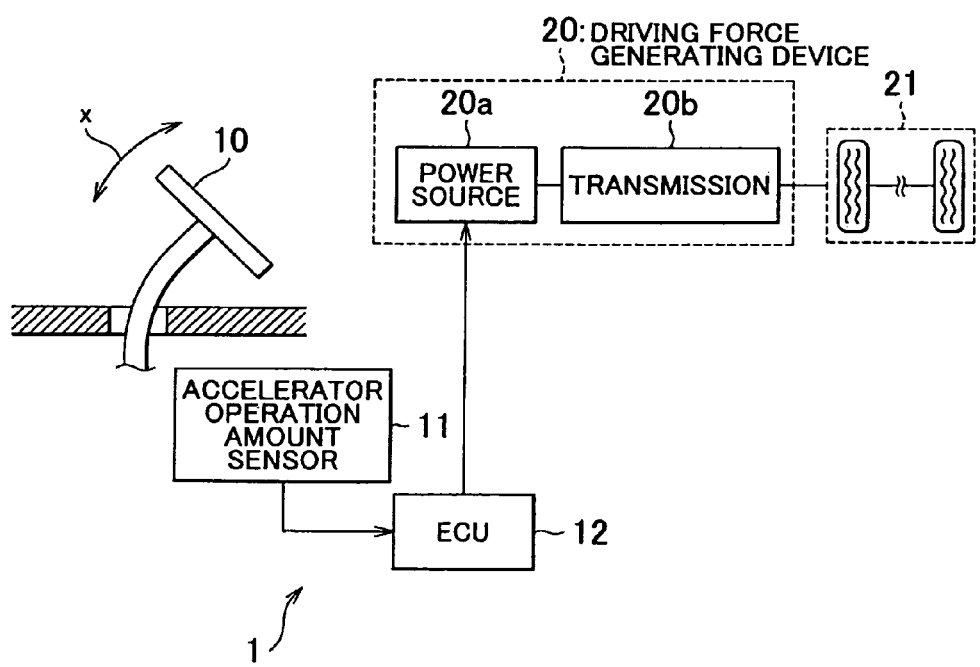
FIG. 1 is a block diagram that shows the schematic configuration of a vehicle running control system according to a first embodiment of the invention.

Hereinafter, a vehicle running control system according to a first embodiment will be described. FIG. 1 is a block diagram that shows the schematic configuration of a vehicle running control system according to the first embodiment.

The vehicle running control system 1 controls a driving force generating device 20 to thereby control running of a vehicle. The driving force generating device 20 includes a power source 20a and a transmission 20b. The driving force generating device 20 increases or decreases power generated by the power source 20a or changes the speed of the transmission 20b to increase or decrease power transmitted through the transmission 20b. By so doing, the driving force generating device 20 is able to increase or decrease driving force. That is, the vehicle running control system 1 according to the first embodiment controls the driving force generating device 20 to appropriately increase or decrease driving force to thereby control running of the vehicle. The vehicle running control system 1 includes an accelerator pedal 10, an accelerator position sensor 11 and an ECU 12.

Here, the power source 20a generates power for propelling the vehicle, such as an automobile, and an engine is used as the power source 20a. Note that the power source 20a may be, for example, an electric motor or a so-called hybrid power source that is a combination of an engine and an electric motor. The power source 20a is directly or indirectly coupled to driving wheels 21 of the vehicle via the transmission 20b connected to the power source 20a. When the power source 20a is connected to the driving wheels 21 via the transmission 20b, the power source 20a is able to transmit generated power to the driving wheels 21 as driving force via the transmission 20b to thereby propel the vehicle.

The accelerator pedal 10 is an accelerator operator. The accelerator pedal 10 serves as input means when power generated by the power source 20a is increased or decreased or the speed of the transmission 20b is changed to increase or decrease power transmitted through the transmission 20b.

The accelerator position sensor 11 is provided as accelerator position detecting means that detects an accelerator position. The accelerator position sensor 11 is able to output an accelerator position signal that is a signal corresponding to a position of the accelerator pedal 10 in the operating direction of the accelerator pedal 10, indicated by the arrow x in FIG. 1, that is, the direction of movement of the accelerator pedal 10.

The ECU 12 includes a processing unit (not shown), a storage unit (not shown) and an input/output unit (not shown). The processing unit carries out processing. The storage unit stores numeric values, or the like. The input/output unit inputs or outputs signals. The ECU 12 is able to control the driving force generating device 20 in accordance with operation procedure, which will be described later.

Figure 2:
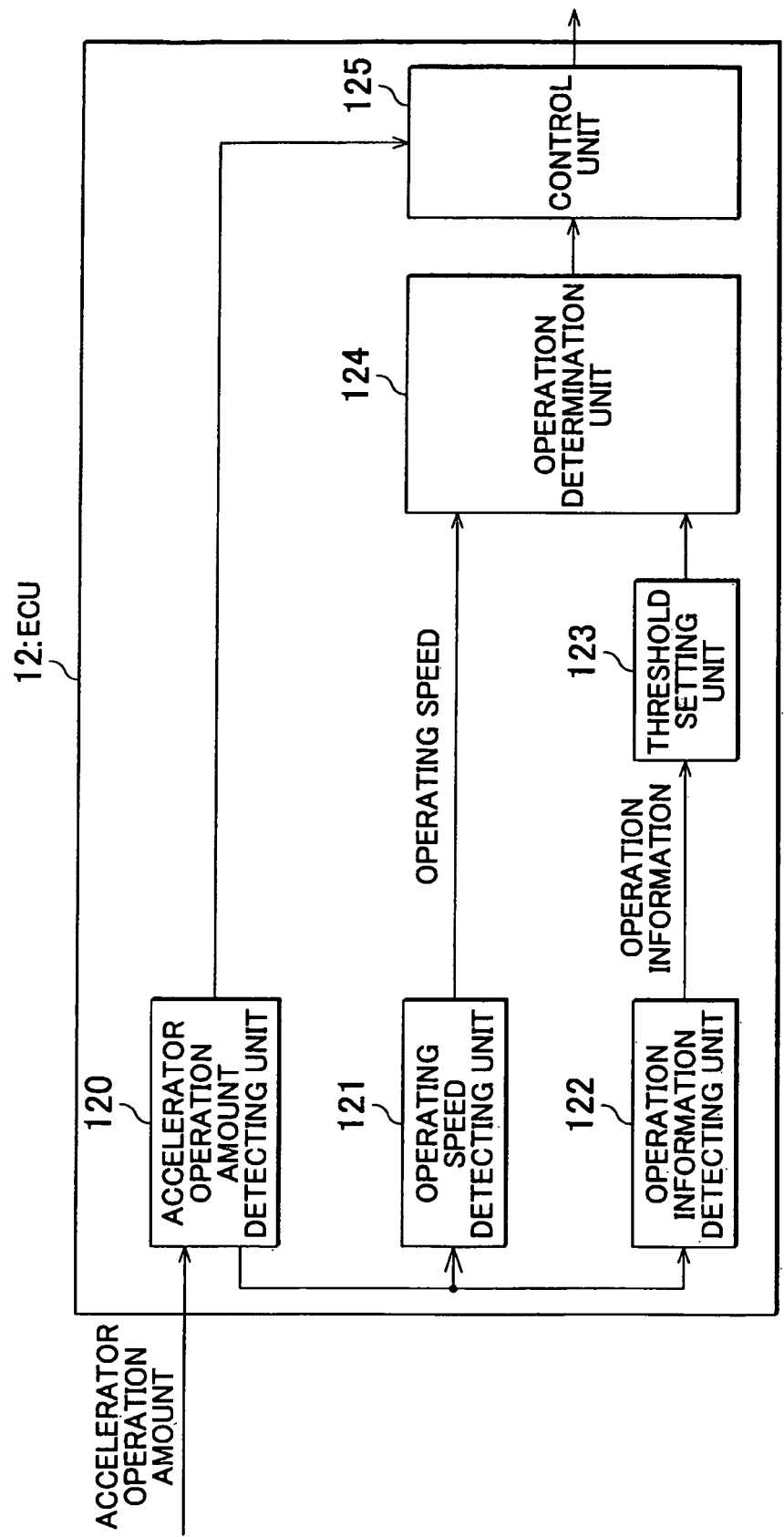
FIG. 2 is a functional block diagram that schematically shows the configuration of functions of an ECU according to the first embodiment of the invention.

FIG. 2 is a functional block diagram that schematically shows the configuration of functions of the ECU 12. As shown in FIG. 2, the ECU 12 includes an accelerator position detecting unit 120, an operating speed detecting unit 121, an operation information detecting unit 122, a threshold setting unit 123, an operation determination unit 124 and a control unit 125. These are included in the above described processing unit.

The accelerator position detecting unit 120 corresponds to the accelerator position detecting means, and detects the accelerator position on the basis of the accelerator position signal output from the accelerator position sensor 11.

The operating speed detecting unit 121 corresponds to operating speed detecting means, and detects the operating speed of the accelerator pedal 10 on the basis of the accelerator position detected by the accelerator position detecting unit 120.

The operation information detecting unit 122 corresponds to operation information detecting means, and detects the operation information of the accelerator pedal 10 on the basis of the accelerator position detected by the accelerator position detecting unit 120. Note that the operation information of the accelerator pedal 10 here is information, other than the operating speed of the accelerator pedal 10, within information related to driver's operation of the accelerator pedal 10. The operation information is, for example, a stroke amount that is an operation amount of the accelerator pedal 10 when the driver has operated the accelerator pedal 10, an accelerator position when the driver starts operating the accelerator pedal 10, information as to whether the driver has depressed the fully closed accelerator pedal 10 when the driver starts operating the accelerator pedal 10, or the like. Hereinafter, in the vehicle running control system 1 according to the first embodiment, an example in which the operation information of the accelerator pedal 10 is a stroke amount will be described.

The threshold setting unit 123 corresponds to threshold setting means, and sets the threshold of the operating speed of the accelerator pedal 10 to change the threshold of the operating speed of the accelerator pedal 10 on the basis of the stroke amount that is the operation information of the accelerator pedal 10, detected by the operation information detecting unit 122. The threshold of the operating speed of the accelerator pedal 10 here is a quick operation determination threshold for determining whether the driver has quickly operated the accelerator pedal 10.

The operation determination unit 124 corresponds to determination means, and determines whether the operating speed of the accelerator pedal 10, detected by the operating speed detecting unit 121, is higher than or equal to the threshold set by the threshold setting unit 123.

The control unit 125 corresponds to driving force control means, and controls the power source 20a in accordance with the result of determination made by the operation determination unit 124. When the control unit 125 controls the power source 20a, the control unit 125 causes the power source 20a to generate power having a magnitude corresponding to the accelerator position detected by the accelerator position detecting unit 120.

Next, the operation of the vehicle running control system 1 according to the first embodiment will be described.

As the driver depresses or returns the accelerator pedal 10, the accelerator position signal corresponding to this operation is output from the accelerator position sensor 11. In this case, the accelerator position detecting unit 120 detects the accelerator position on the basis of the accelerator position signal output from the accelerator position sensor 11. Then, the control unit 125 controls the power source 20a on the basis of the accelerator position detected by the accelerator position detecting unit 120. By so doing, the control unit 125 controls power generated by the power source 20a to thereby control driving force.

In addition, the vehicle running control system 1 changes details that the control unit 125 controls the power source 20a in response to the result of determination made by the operation determination unit 124. In the vehicle running control system 1 according to the first embodiment, the operation determination unit 124 determines whether the driver has quickly operated the accelerator pedal 10 on the basis of the operating speed of the accelerator pedal 10, detected by the operating speed detecting unit 121, and the stroke amount of the accelerator pedal 10, detected by the operation information detecting unit 122. The operation determination unit 124 determines whether the operating speed of the accelerator pedal 10 is higher than or equal to a threshold, and the control unit 125 changes the details of control over the power source 20a on the basis of the result of determination made by the operation determination unit 124.

FIG. 3A to FIG. 3C are timing charts that show changes over time of the accelerator position, the operating speed of the accelerator pedal 10 and the quick depression determination flag. Note that the character a shown in FIG. 3A indicates the accelerator position before the driver depresses the accelerator pedal 10. As shown in FIG. 3A and FIG. 3B, for example, as the driver depresses the accelerator pedal 10 and then the accelerator position increases (time t1), the operation information detecting unit 122 obtains the stroke amount of the accelerator pedal 10 in a determination period T on the basis of the accelerator position detected by the accelerator position detecting unit 120. The determination period T is a period during which it is determined whether the driver has quickly operated the accelerator pedal 10, and is a period from when the operating speed of the accelerator pedal 10 exceeds a detection start speed (discussed later) to when the operating speed varies by a speed variation $\Delta v$ (discussed later) with respect to a peak operating speed (discussed later) of the accelerator pedal 10. Note that the character t2 shown in FIG. 3A to FIG. 3C indicates the end of the determination period T.

Figure 4A:
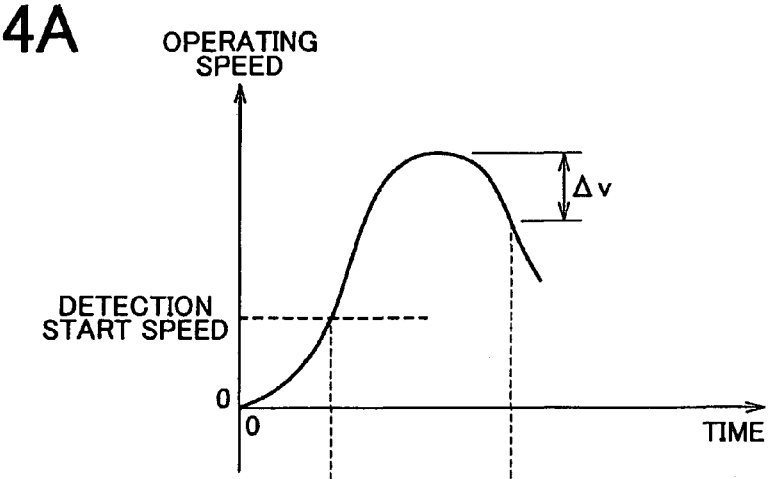
FIG. 4A and FIG. 4B are graphs that respectively show changes over time of operating speed and accelerator position when a driver depresses the accelerator pedal according to the first embodiment of the invention.
Figure 4B:
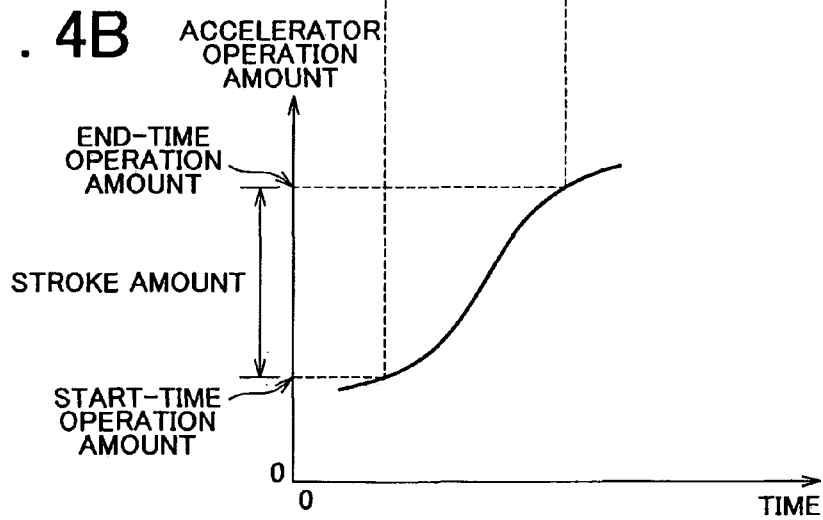

More specifically, in the vehicle running control system 1 according to the first embodiment, the operation information detecting unit 122 obtains the stroke amount of the accelerator pedal 10 as follows. FIG. 4A and FIG. 4B are graphs that show changes over time of the operating speed and the accelerator position when the driver depresses the accelerator pedal 10. As shown in FIG. 4A and FIG. 4B, when the driver depresses the accelerator pedal 10, the accelerator position detecting unit 120 detects a start-time operation amount. The start-time operation amount is an accelerator position at an instant at which the operating speed of the accelerator pedal 10 exceeds a detection start speed that is preset in the operating speed detecting unit 121. Here, the detection start speed is a threshold at which the operating speed detecting unit 121 starts measuring the operating speed of the accelerator pedal 10 in order for the operation information detecting unit 122 to detect the stroke amount of the accelerator pedal 10. The detection start speed is prestored in the storage unit of the ECU 12.

Then, the operating speed detecting unit 121 detects the peak operating speed that is the peak value of the operating speed of the accelerator pedal 10 thereafter, and, furthermore, the accelerator position detecting unit 120 detects an end-time operation amount that is the accelerator position at which a variation with respect to the start-time operation amount is the largest in a period from when the operating speed of the accelerator pedal 10 reaches the peak operating speed to when the operating speed varies by a speed variation $\Delta v$ with respect to the peak operating speed. That is, the end-time operation amount when the driver depresses the accelerator pedal 10 is an accelerator position at time t2, and is a maximum accelerator position in the determination period T. Here, the operating speed detecting unit 121 detects the maximum value of the operating speed in the direction in which the accelerator pedal 10 is depressed as the peak operating speed, and the accelerator position detecting unit 120 detects an accelerator position at the end of the determination period T (time t2), which is maximum in a period from when the operating speed of the accelerator pedal 10 reaches the peak operating speed to when the operating speed decreases by a speed variation $\Delta v$ with respect to the peak operating speed, as the end-time operation amount. Then, the operation information detecting unit 122 calculates a difference between the start-time operation amount detected by the accelerator position detecting unit 120 and the end-time operation amount, and sets the absolute value of the difference as the stroke amount of the accelerator pedal 10.

Note that the peak operating speed is obtained in such a manner that, for example, the operating speed detecting unit 121 calculates the differential value of the operating speed of the accelerator pedal 10 while detecting the operating speed of the accelerator pedal 10 when the sign of the differential value changes. That is, the peak operating speed is obtained in such a manner that, for example, the operating speed detecting unit 121 detects the operating speed of the accelerator pedal 10 when the sign of the differential value of the operating speed of the accelerator pedal 10 changes from positive to negative or from negative to positive. In addition, the speed variation $\Delta v$ is used to end measuring the operating speed of the accelerator pedal 10, and is prestored in the storage unit of the ECU 12.

Here, the reason for setting the speed variation $\Delta v$ will be described. Even when the operating speed of the accelerator pedal 10 reaches the peak operating speed and then starts decreasing, during a certain period thereafter, the accelerator pedal 10 moves in the same direction as the accelerator pedal 10 at the time when the operating speed has reached the peak operating speed. That is, the stroke amount of the accelerator pedal 10 continues to increase during a certain period even after the operating speed has reached the peak operating speed. Then, the operation information detecting unit 122 dose not obtain a difference between the start-time operation amount and the accelerator position at the time when the operating speed of the accelerator pedal 10 has reached the peak operating speed but obtains a difference between the start-time operation amount and the above described end-time operation amount, and then obtains the stroke amount of the accelerator pedal 10 on the basis of the obtained difference. That is, the operation information detecting unit 122 sets the speed variation $\Delta v$ in order to further appropriately detect the stroke amount of the accelerator pedal 10, which reflects a driver's intention.

On the other hand, when the driver returns the accelerator pedal 10, the accelerator position detecting unit 120 detects the start-time operation amount. Then, the operating speed detecting unit 121 detects the maximum value of the operating speed in the direction in which the accelerator pedal 10 is returned as the peak operating speed, and then the accelerator position detecting unit 120 detects an accelerator position, which is minimum in a period from when the operating speed of the accelerator pedal 10 reaches the peak operating speed to when the operating speed decreases by the speed variation $\Delta v$ with respect to the peak operating speed, as the end-time operation amount. Then, the operation information detecting unit 122 calculates a difference between the start-time operation amount detected by the accelerator position detecting unit 120 and the end-time operation amount, and sets the absolute value of the difference as the stroke amount of the accelerator pedal 10.

In the above described manner, the operation information detecting unit 122 detects the stroke amount of the accelerator pedal 10.

Figure 5A:
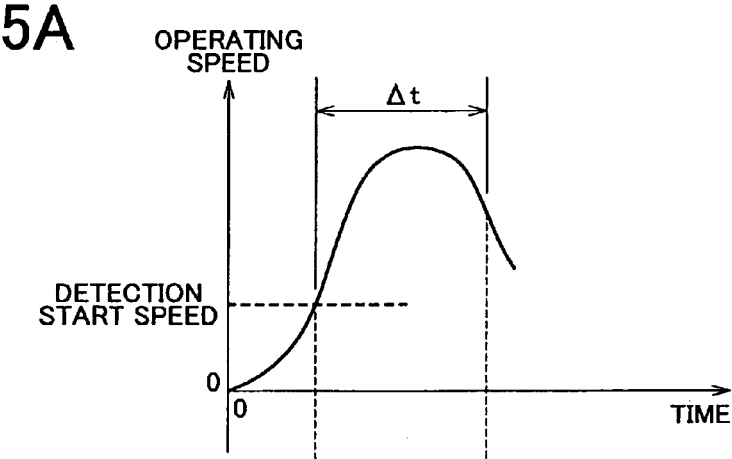
FIG. 5A and FIG. 5B are graphs that respectively show changes over time of operating speed and accelerator position when the driver depresses the accelerator pedal according to the first embodiment of the invention.
Figure 5B:
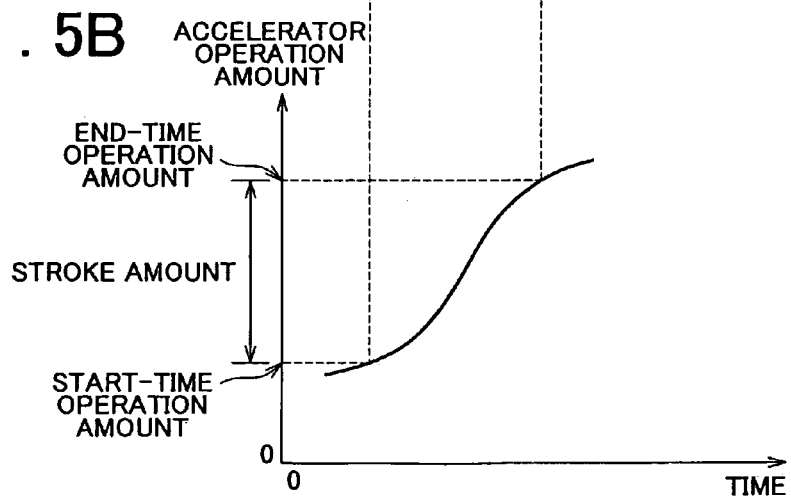

Note that detecting the stroke amount of the accelerator pedal 10 by the operation information detecting unit 122 may be carried out by a method other than the above described method. FIG. 5A and FIG. 5B are graphs that show changes over time of the operating speed and the accelerator position when the driver depresses the accelerator pedal 10. For example, as shown in FIG. 5A and FIG. 5B, when the driver depresses the accelerator pedal 10, the accelerator position detecting unit 120 detects the start-time operation amount and then detects the end-time operation amount. The end-time operation amount here is an accelerator position at which a variation with respect to the start-time operation amount is the largest in a period from when the operating speed of the accelerator pedal 10 exceeds the detection start speed to when a time variation Δt elapses. That is, even when the end-time operation amount is obtained in this way, the end-time operation amount when the driver depresses the accelerator pedal 10 is an accelerator position at time t2, and is a maximum accelerator position in the determination period T. The determination period T in this case is a period from when the operating speed of the accelerator pedal 10 exceeds the detection start speed to when the time variation Δt elapses. Here, the accelerator position detecting unit 120 detects the maximum accelerator position at the end of the determination period T (time t2) in a period from when the operating speed of the accelerator pedal 10, detected by the operating speed detecting unit 121, exceeds the detection start speed to when the time variation Δt elapses as the end-time operation amount. In addition, the time variation Δt is used to end measuring the operating speed of the accelerator pedal 10, and is prestored in the storage unit of the ECU 12. Then, the operation information detecting unit 122 calculates a difference between the start-time operation amount detected by the accelerator position detecting unit 120 and the end-time operation amount, and sets the absolute value of the difference as the stroke amount of the accelerator pedal 10. In addition, when the driver returns the accelerator pedal 10 as well, the accelerator position detecting unit 120 detects the start-time operation amount and the end-time operation amount. In this case, the accelerator position detecting unit 120 detects an accelerator position, which is minimum in a period from when the operating speed of the accelerator pedal 10, detected by the operating speed detecting unit 121, exceeds the detection start speed to when the time variation Δt elapses, as the end-time operation amount. Then, the operation information detecting unit 122 calculates a difference between the start-time operation amount detected by the accelerator position detecting unit 120 and the end-time operation amount, and sets the absolute value of the difference as the stroke amount of the accelerator pedal 10.

As the operation information detecting unit 122 detects the stroke amount of the accelerator pedal 10, the threshold setting unit 123 sets a threshold th1 on the basis of the stroke amount of the accelerator pedal 10, detected by the operation information detecting unit 122.

More specifically, as the threshold setting unit 123 detects the stroke amount that is the operation information of the accelerator pedal 10, the threshold setting unit 123 refers to a threshold setting map stored in the storage unit, and then sets a threshold for determining whether the driver has quickly operated the accelerator pedal 10. Here, the threshold setting map associates the stroke amount of the accelerator pedal 10, which is the operation information of the accelerator pedal 10, with the threshold set by the threshold setting unit 123, and is, for example, a look-up table (LUT).

Incidentally, the operating speed of the accelerator pedal 10 tends to increase as the stroke amount of the accelerator pedal 10 increases. Therefore, in the threshold setting map, the quick operation determination threshold th1 is set so as to increase as the stroke amount of the accelerator pedal 10 increases. Thus, the threshold setting unit 123 that sets the threshold using the threshold setting map increases the set threshold th1 as the stroke amount of the accelerator pedal 10, detected by the operation information detecting unit 122, increases.

Note that, when the threshold setting unit 123 sets the threshold th1 on the basis of the stroke amount of the accelerator pedal 10, the threshold setting unit 123 may, for example, employ a method that uses a threshold setting function that is a function of obtaining the threshold th1 set by the threshold setting unit 123 on the basis of the stroke amount of the accelerator pedal 10 or a method that uses the threshold th1 set through processing executed by the threshold setting unit 123 each time the stroke amount of the accelerator pedal 10 is detected, instead of the above described method that refers to the threshold setting map.

As the threshold setting unit 123 sets the threshold th1, the operation determination unit 124 determines whether the peak operating speed, which is the maximum value of the operating speed of the acceleration pedal 10 in a period during which the stroke amount of the accelerator pedal 10 is detected by the operation information detecting unit 122, is higher than or equal to the threshold th1 to thereby determine whether the driver has quickly depressed the accelerator pedal 10. For example, as shown in FIG. 3B, because the peak operating speed is higher than or equal to the threshold th1, the operation determination unit 124 determines that the driver has quickly depressed the accelerator pedal 10 in this case.

As the operation determination unit 124 determines that the driver has quickly depressed the accelerator pedal 10, the operation determination unit 124 sets the value of a quick depression determination flag at 1, as shown in FIG. 3C. The quick depression determination flag is an operation determination flag at the time of quick depression. That is, when the operating speed of the accelerator pedal 10 is higher than or equal to the threshold th1, the operation determination unit 124 determines that the driver has quickly depressed the accelerator pedal 10, and sets the quick depression determination flag at 1. By so doing, the control unit 125 operates the power source 20a with quick operation control on the basis of the set value, that is, 1, of the quick depression determination flag. That is, the control unit 125 increases a rate of change of power generated by the power source 20a as compared with a normal rate of change that is a rate of change of power generated by the power source 20a during normal times on the basis of the value, that is, 1, of the quick depression determination flag, set by the operation determination unit 124.

In addition, the vehicle running control system 1 sets the value of the operation determination flag during operation of the accelerator pedal 10 at 0 when the operation determination unit 124 determines whether the driver has quickly operated the accelerator pedal 10 on the basis of the operating speed of the accelerator pedal 10, detected by the operating speed detecting unit 121, and the stroke amount of the accelerator pedal 10, detected by the operation information detecting unit 122, and then determines that the driver has not quickly operated the accelerator pedal 10. The control unit 125 operates the power source 20a with normal operation control on the basis of the value, that is, 0, of the operation determination flag, set by the operation determination unit 124.

As described above, the control unit 125 switches between operating the power source 20a with normal operation control and operating the power source 20a with quick operation control on the basis of the value of the operation determination flag, set by the operation determination unit 124.

Next, the operation procedure when the power source 20a is controlled by the vehicle running control system 1 according to the first embodiment will be described.

Figure 6:
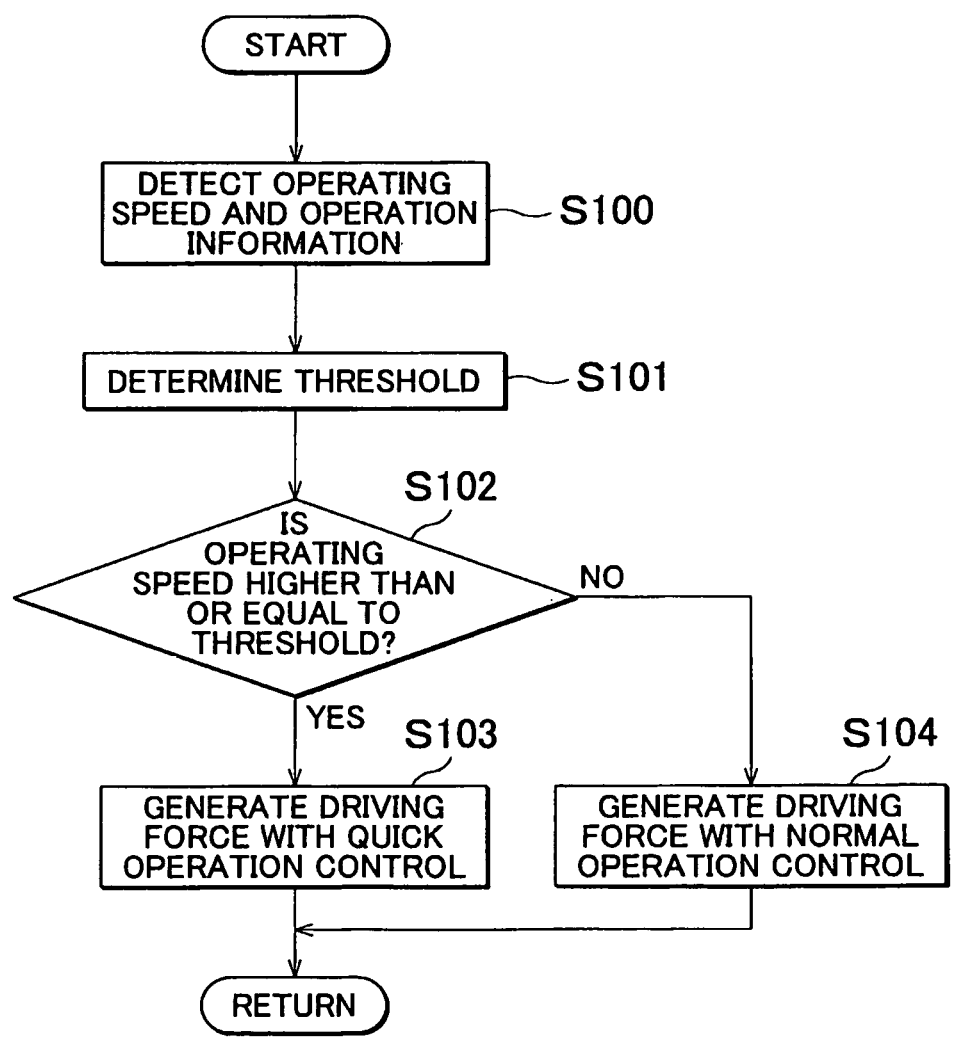
FIG. 6 is a view that shows the flowchart of operation procedure of the vehicle running control system according to the first embodiment of the invention.

FIG. 6 is a view that shows the flowchart of operation procedure of the vehicle running control system 1.

Each time the accelerator position is changed, the ECU 12 calls a determination routine for determining whether the driver has quickly operated the accelerator pedal 10 (START)

and then executes driving force control process that is the process of controlling driving force.

In the determination routine, first, the operating speed detecting unit 121 detects the operating speed of the accelerator pedal 10, and the operation information detecting unit 122 detects the operation information of the accelerator pedal 10 (step S100). Here, the operating speed detecting unit 121 calculates a change over time of the accelerator position on the basis of the result output from the accelerator position detecting unit 120 to thereby obtain the operating speed of the accelerator pedal 10, such as the peak operating speed. In addition, the operation information detecting unit 122 obtains the stroke amount that is the operation information of the accelerator pedal 10 on the basis of the result output from the accelerator position detecting unit 120.

Subsequently, the threshold setting unit 123 sets the quick operation determination threshold th1 on the basis of the stroke amount of the accelerator pedal 10, obtained by the operation information detecting unit 122 (step S101).

After that, the operation determination unit 124 determines whether the operating speed of the accelerator pedal 10, obtained by the operating speed detecting unit 121, is higher than or equal to the threshold th1 set by the threshold setting unit 123 (step S102). Here, the operation determination unit 124 determines whether the peak operating speed detected by the operating speed detecting unit 121 is higher than or equal to the threshold th1 set by the threshold setting unit 123. That is, the operation determination unit 124 compares the peak operating speed of the accelerator pedal 10, detected by the operating speed detecting unit 121, with the threshold th1 set by the threshold setting unit 123 on the basis of the stroke amount of the accelerator pedal 10, detected by the operation information detecting unit 122, to thereby determine whether the accelerator pedal 10 has been quickly depressed or has been quickly released.

When it is determined that the operating speed of the accelerator pedal 10, detected by the operating speed detecting unit 121, is higher than or equal to the threshold th1 set by the threshold setting unit 123 through determination made by the operation determination unit 124 (affirmative determination in step S102), the control unit 125 generates driving force with quick operation control (step S103). That is, when the operating speed of the accelerator pedal 10, detected by the operating speed detecting unit 121, is higher than or equal to the threshold th1 set by the threshold setting unit 123, the operation determination unit 124 determines that the driver has quickly depressed or quickly released the accelerator pedal 10 and then sets the operation determination flag at 1. Then, the control unit 125, for example, increases the rate of change of power generated by the power source 20a as compared with the normal rate of change that is the rate of change of power generated by the power source 20a during normal times on the basis of the value, that is, 1, of the operation determination flag. By so doing, for example, when the operation determination unit 124 determines that the driver has quickly depressed the accelerator pedal 10, the control unit 125 increases a target output value set in correspondence with the accelerator position detected by the accelerator position detecting unit 120 with respect to a target output value during normal operation, set in correspondence with the detected accelerator position. Note that the target output value here is an output value of the vehicle, required by the driver, and is, for example, a target acceleration, a target torque, a target driving force, or the like. In addition, for example, when the operation determination unit 124 determines that the driver has quickly released the accelerator pedal 10, the control unit 125 decreases the target output value with respect to the target output value used in normal operation control to thereby, for example, increase a target deceleration. In the above described manner, when the control unit 125 generates driving force with quick operation control, the control unit 125 maintains quick operation control until the driver operates the accelerator pedal 10 to change the accelerator position again (RETURN).

In addition, when the operation determination unit 124 determines that the operating speed of the accelerator pedal 10, detected by the operating speed detecting unit 121, is lower than the threshold th1 set by the threshold setting unit 123 (negative determination in step S102), the control unit 125 generates driving force with normal operation control (step S104). That is, because the peak operating speed of the accelerator pedal 10, detected by the operating speed detecting unit 121, is lower than the quick operation determination threshold th1 set by the threshold setting unit 123 in accordance with the stroke amount of the accelerator pedal 10, set by the operation information detecting unit 122, the operation determination unit 124 determines that the driver has neither quickly depressed the accelerator pedal 10 nor quickly released the accelerator pedal 10, and then sets the value of the operation determination flag at 0. Then, the control unit 125 sets the rate of change of power generated by the power source 20a to the normal rate of change on the basis of the value of the operation determination flag, that is, 0. By so doing, when the operation determination unit 124 determines that the driver has neither quickly depressed the accelerator pedal 10 nor quickly released the accelerator pedal 10, the control unit 125 sets the target output value set in correspondence with the accelerator position detected by the accelerator position detecting unit 120 to the target output value during normal operation, set in correspondence with the detected accelerator position.

As described above, in the vehicle running control system 1 according to the first embodiment of the invention, when the operation determination unit 124 determines whether the operating speed of the accelerator pedal 10 is higher than or equal to the quick operation determination threshold th1, the threshold setting unit 123 changes the quick operation determination threshold th1 on the basis of the stroke amount that is the operation information of the accelerator pedal 10. That is, when the operation determination unit 124 determines whether the accelerator pedal 10 has been quickly operated, the operation determination unit 124 determines whether the operating speed of the accelerator pedal 10 is higher than or equal to the quick operation determination threshold th1 that is changed on the basis of the stroke amount that is the operation information. By so doing, the vehicle running control system 1 is able to improve the accuracy of determination as to whether the driver has quickly operated the accelerator pedal 10 as compared with, for example, the vehicle running control system that is configured to determine whether the driver has quickly operated the accelerator pedal on the basis of only the operating speed of the accelerator pedal 10.

In addition, when the vehicle running control system 1 according to the first embodiment of the invention determines whether the accelerator pedal 10 has been quickly operated, the operation determination unit 124 determines whether the operating speed of the accelerator pedal 10 is higher than or equal to the quick operation determination threshold th1 that is changed on the basis of the stroke amount that is the operation information of the accelerator pedal 10. Therefore, the control unit 125 changes the details of control over the power source 20a of the driving force generating device 20 on the basis of determination made by the operation determination unit 124, and the determination changes on the basis of the stroke amount of the accelerator pedal 10. That is, the control unit 125 changes the details of control over driving force on the basis of determination made by the operation determination unit 124, and the determination changes on the basis of the stroke amount of the accelerator pedal 10. By so doing, the vehicle running control system 1 according to the first embodiment of the invention is able to further accurately reflect a driver's intention on running control over the vehicle as compared with, for example, the vehicle running control system that is configured to change the details of control over driving force on the basis of only the operating speed of the accelerator pedal. That is, the vehicle running control system 1 according to the first embodiment of the invention is able to improve a reflection of a driver's intention on running of the vehicle when the driver has operated the accelerator pedal 10.

In addition, in the vehicle running control system 1 according to the first embodiment of the invention, as described above, the control unit 125 changes the details of control over the power source 20a on the basis of determination made by the operation determination unit 124, and the determination changes on the basis of the stroke amount of the accelerator pedal 10. Therefore, for example, during normal times, in a state where the driver depresses the accelerator pedal 10 by a relatively large amount or returns the accelerator pedal 10 by a relatively large amount and then the stroke amount of the accelerator pedal 10 becomes relatively large, when the absolute value of the operating speed of the accelerator pedal 10 becomes relatively large and then the operating speed of the accelerator pedal 10 becomes higher than or equal to the quick operation determination threshold th1 that is changed by the threshold setting unit 123, the control unit 125 sets the rate of change of power generated by the power source 20a to be larger than the normal rate of change. Therefore, for example, when the operation determination unit 124 determines that the driver has quickly depressed the accelerator pedal 10, the control unit 125 causes the power source 20a to generate power larger than power generated in normal operation control to thereby increase driving force. In contrast to this, when the operation determination unit 124 determines that the driver has quickly released the accelerator pedal 10, the control unit 125 causes the power source 20a to generate power smaller than power generated in normal operation control to thereby decrease driving force. That is, when the operation determination unit 124 determines that the driver has quickly released the accelerator pedal 10, the control unit 125, for example, causes the power source 20a to generate a deceleration higher than an acceleration of the vehicle, generated in normal operation control. As described above, when the driver has quickly depressed or quickly released the accelerator pedal 10, the control unit 125 increases the rate of change of power generated by the power source 20a as compared with the normal rate of change, so the vehicle running control system 1 is able to improve the response of driving force when the driver has quickly operated the accelerator pedal 10 as compared with the response of driving force in normal operation control.

In addition, in the vehicle running control system 1 according to the first embodiment of the invention, the operation information detecting unit 122 obtains the stroke amount of the accelerator pedal 10 on the basis of the difference between the start-time operation amount and the above described end-time operation amount. By so doing, in comparison with the configuration that the stroke amount of the accelerator pedal is obtained on the basis of the difference between the start-time operation amount and the accelerator position at the time when the operating speed of the accelerator pedal has reached the peak operating speed, it is possible to improve the accuracy of detecting the stroke amount of the accelerator pedal 10.

In addition, in the vehicle running control system 1 according to the first embodiment of the invention, as the stroke amount of the accelerator pedal 10, detected by the operation information detecting unit 122, increases, the quick operation determination threshold th1 changed by the threshold setting unit 123 is set to be higher. Therefore, for example, when the driver intends to control the power source 20a with normal operation control as well, it is possible to improve a reflection of a driver's intention on running of the vehicle when the driver has operated the accelerator pedal 10. That is, in the vehicle running control system 1 according to the first embodiment of the invention, even when the stroke amount of the accelerator pedal 10 becomes relatively large during normal times, the control unit 125 controls the power source 20a with normal operation control when the operating speed of the accelerator pedal 10 is lower than the threshold th1. By so doing, the vehicle running control system 1 according to the first embodiment of the invention is able to further accurately reflect a driver's intention of controlling the power source 20a with normal operation control on running control over the vehicle in comparison with, for example, the vehicle running control system that is configured to control the power source on the basis of only the operating speed of the accelerator pedal 10.

Second Embodiment

Next, a vehicle running control system according to a second embodiment will be described. Here, the vehicle running control system according to the second embodiment has such a feature that it is determined whether the driver has quickly released the accelerator pedal 10 on the basis of the detected accelerator position when the driver has released depression of the accelerator pedal 10. Other than the above, the vehicle running control system 1 according to the second embodiment has the same basic configuration as that of the vehicle running control system 1 according to the first embodiment, so the description thereof is omitted.

Hereinafter, in the second embodiment, the case where the operation information of the accelerator pedal 10 is an accelerator position when the driver starts operating the accelerator pedal 10 is taken as an example, and the configuration that it is determined whether the driver has quickly released the accelerator pedal 10 on the basis of the detected accelerator position when the driver has released depression of the accelerator pedal 10 will be described.

Figure 7A:
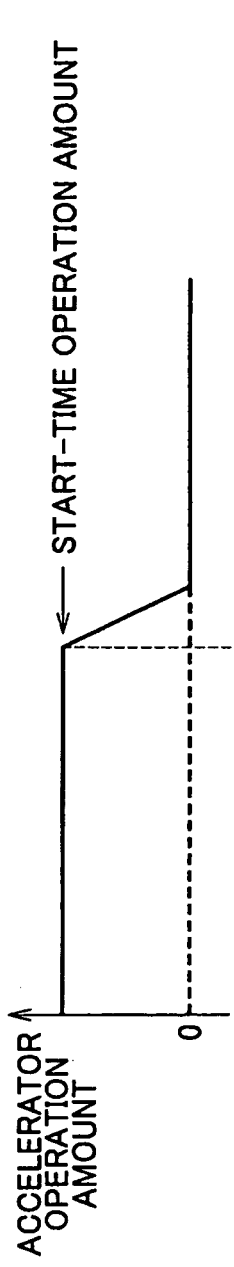
FIG. 7A to FIG. 7C are timing charts that show changes over time of accelerator position, accelerator pedal operating speed and quick release determination flag in a vehicle running control system according to a second embodiment of the invention.
Figure 7B:
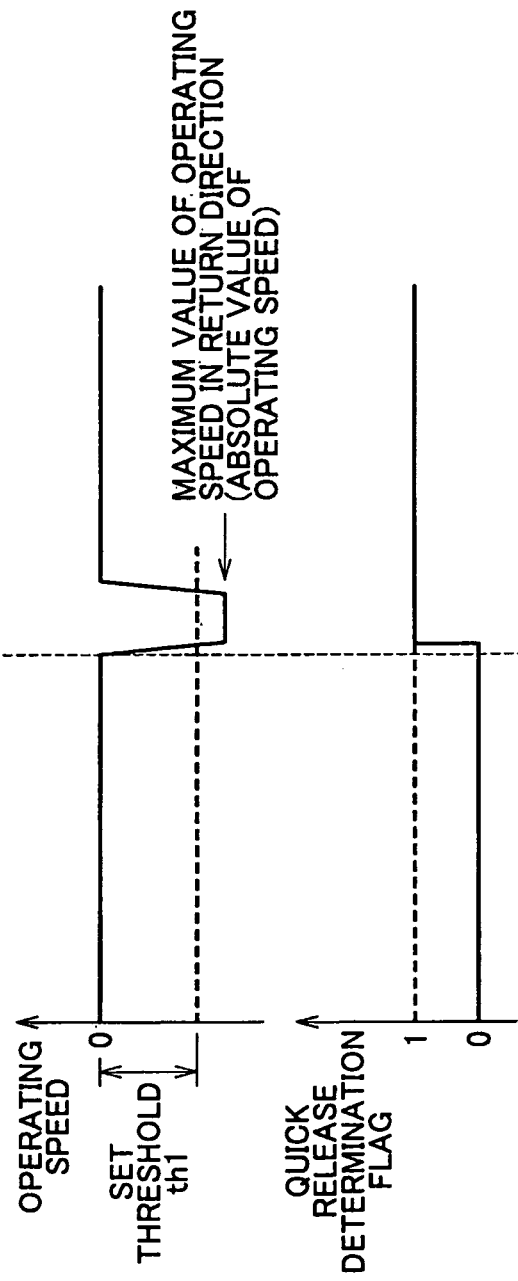
Figure 7C:
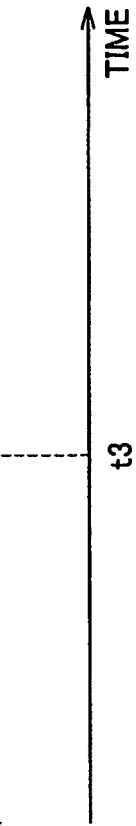

FIG. 7A to FIG. 7C are timing charts that show changes over time of the accelerator position, the operating speed of the accelerator pedal 10 and the quick release determination flag in the vehicle running control system according to the second embodiment. As shown in FIG. 7A and FIG. 7B, as the driver releases the foot from the accelerator pedal 10 and then the accelerator position decreases (time t3), the accelerator position detecting unit 120 detects the start-time operation amount as described above.

Figure 8A:
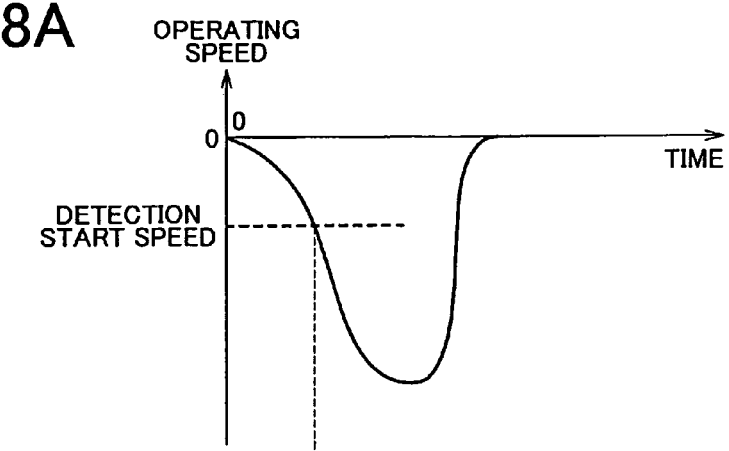
FIG. 8A and FIG. 8B are graphs that respectively show changes over time of operating speed and accelerator position when the driver has released the foot from the accelerator pedal according to the second embodiment of the invention.
Figure 8B:
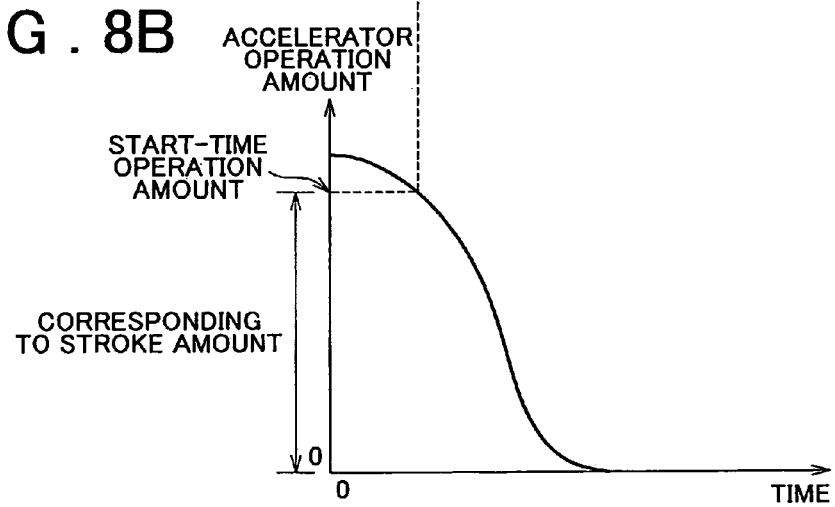

FIG. 8A and FIG. 8B are graphs that show changes over time of the operating speed and the accelerator position when the driver has released the foot from the accelerator pedal 10. As shown in FIG. 8A and FIG. 8B, when the driver has released the foot from the accelerator pedal 10, the accelerator position detecting unit 120 detects the start-time operation amount, and then the operation information detecting unit 122 directly handles the detected start-time operation amount as the operation information corresponding to the stroke amount.

As shown in FIG. 7A to FIG. 7C, as the operation information detecting unit 122 detects the operation information corresponding to the stroke amount of the accelerator pedal 10 on the basis of the accelerator position detected by the accelerator position detecting unit 120, the threshold setting unit 123 sets the quick operation determination threshold th1 on the basis of the operation information of the accelerator pedal 10, detected by the operation information detecting unit 122.

Then, the operation determination unit 124 determines whether the peak operating speed of the accelerator pedal 10 after the accelerator position detecting unit 120 detects the accelerator position is higher than or equal to the threshold th1 to thereby determine whether the driver has quickly released the accelerator pedal 10. Here, the operation determination unit 124 detects the peak operating speed of the accelerator pedal 10 from the absolute value of the operating speed of the accelerator pedal 10. That is, the peak operating speed in this case is the maximum value of the operating speed in the direction in which the accelerator pedal 10 returns. As shown in FIG. 7B, when the peak operating speed of the accelerator pedal 10, detected by the operating speed detecting unit 121, is higher than or equal to the threshold th1 set by the threshold setting unit 123, the operation determination unit 124 determines that the driver has quickly released the accelerator pedal 10.

Then, when the operation determination unit 124 determines that the driver has quickly released the accelerator pedal 10, the operation determination unit 124 sets the value of the quick release determination flag at 1, as shown in FIG. 7C. The quick release determination flag is an operation determination flag at the time when the driver has quickly released the accelerator pedal 10. Then, the control unit 125 causes the power source 20a to operate with quick operation control on the basis of the set value, that is, 1, of the quick release determination flag.

More specifically, when the driver quickly releases the accelerator pedal 10, the driver mostly releases the foot from the accelerator pedal 10 until the accelerator pedal 10 is fully closed. As the driver quickly releases the accelerator pedal 10 until the accelerator pedal 10 is fully closed, the accelerator position becomes the minimum value, that is, the accelerator position becomes 0%, in a short period of time. Therefore, even when the operation information detecting unit 122 does not obtain the difference between the start-time operation amount and the end-time operation amount to detect the stroke amount of the accelerator pedal 10 from the absolute value of the difference unlike the vehicle running control system 1 according to the first embodiment, the operation information detecting unit 122 is able to detect information corresponding to the stroke amount of the accelerator pedal 10 from the accelerator position itself at the time when the driver has quickly released the accelerator pedal 10, as shown in FIG. 8A and FIG. 8B.

Thus, in the vehicle running control system 1 according to the second embodiment, not the operation information detecting unit 122 detects the stroke amount of the accelerator pedal 10 but the operation information detecting unit 122 uses the accelerator position detected by the accelerator position detecting unit 120 at the time when the driver has quickly released the accelerator pedal 10 as the operation information of the accelerator pedal 10. By so doing, it is possible to omit time and effort for calculating the stroke amount of the accelerator pedal 10 by the operation information detecting unit 122 and a time lag resulting from calculation of the stroke amount of the accelerator pedal 10. Thus, the vehicle running control system 1 is able to promptly determine whether the driver has quickly released the accelerator pedal 10.

Third Embodiment

Next, a vehicle running control system according to a third embodiment will be described. The vehicle running control system according to the third embodiment has such a feature that, when the driver depresses the fully closed accelerator pedal 10, the quick operation determination threshold is set to be higher than the quick operation determination threshold in the case where the driver has additionally depressed the accelerator pedal 10. Other than the above, the vehicle running control system according to the third embodiment has the same basic configuration as that of the vehicle running control system 1 according to the first embodiment, so the description thereof is omitted.

Hereinafter, in the third embodiment, the case where the operation information of the accelerator pedal 10 is information as to whether the driver has depressed the fully closed accelerator pedal 10 when the driver starts operating the accelerator pedal 10 will be described as an example.

FIG. 9A to FIG. 9C are timing charts that show changes over time of the accelerator position, the operating speed of the accelerator pedal 10 and the quick depression determination flag in the vehicle running control system according to the third embodiment. As shown in FIG. 9A and FIG. 9B, as the driver depresses the accelerator pedal 10 and then the accelerator position increases (time t4), the accelerator position detecting unit 120 detects the start-time operation amount. At this time, as the accelerator position detecting unit 120 detects that the start-time operation amount is 0%, that is, the accelerator position is fully closed, the operation information detecting unit 122 detects information that the driver has depressed the fully closed accelerator pedal 10 on the basis of the result detected by the accelerator position detecting unit 120.

Then, as the operation information detecting unit 122 has detected such operation information, the threshold setting unit 123 sets a quick operation determination threshold th3, which is higher than a quick operation determination threshold th2 in the case where the driver has additionally depressed the accelerator pedal 10, on the basis of the detected operation information.

Then, the operating speed detecting unit 121 detects the maximum value of the operating speed in the direction in which the accelerator pedal 10 is depressed as the peak operating speed in the determination period T during which it is determined whether the driver has quickly operated the accelerator pedal 10. Furthermore, the operation determination unit 124 determines whether the peak operating speed detected by the operating speed detecting unit 121 is higher than or equal to the threshold th3 set by the threshold setting unit 123. That is, the operation determination unit 124 determines whether the driver has quickly depressed the accelerator pedal 10. Then, even when the peak operating speed detected by the operating speed detecting unit 121 is higher than or equal to the threshold th2, when the operation determination unit 124 determines that the peak operating speed is lower than the threshold th3 set by the threshold setting unit 123, the operation determination unit 124 sets the value of the quick depression determination flag at 0, as shown in FIG. 9C.

In this case, the control unit 125 operates the power source 20a with normal operation control on the basis of the value, that is, 0, of the quick depression determination flag set by the operation determination unit 124.

In addition, when the operation determination unit 124 determines that the peak operating speed detected by the operating speed detecting unit 121 is higher than or equal to the threshold th3 set by the threshold setting unit 123, the operation determination unit 124 sets the value of the quick depression determination flag at 1. In this case, the control unit 125 operates the power source 20a with quick operation control on the basis of the value, that is, 1, of the quick depression determination flag set by the operation determination unit 124.

The vehicle running control system 1 according to the third embodiment operates as described above. Therefore, for example, in the case where the driver intends to generate driving force with normal operation control, when the driver depresses the accelerator pedal 10 from a state where the foot is released from the accelerator pedal 10 and then the operating speed of the accelerator pedal 10 becomes higher than that when the accelerator pedal 10 has been additionally depressed, the operation determination unit 124 determines that the driver has not quickly depressed the accelerator pedal 10 when the peak operating speed of the accelerator pedal 10 is lower than the post-changed threshold th3 even when the peak operating speed is higher than the pre-changed threshold th2. In such a case, the control unit 125 does not cause the power source 20a to be driven with quick operation control but causes the power source 20a to be driven with normal operation control on the basis of the result of determination made by the operation determination unit 124.

That is, even when the driver depresses the accelerator pedal 10 from the fully closed state, the ECU 12 is able to reflect a driver's intention of generating driving force with normal operation control on driving force control over the power source 20a. That is, in the case where the driver intends to generate driving force with normal operation control, even when the driver depresses the accelerator pedal 10 from the state where the foot is released from the accelerator pedal 10 and then the operating speed of the accelerator pedal 10 becomes higher than the normal speed when the accelerator pedal 10 has been additionally depressed, the vehicle running control system 1 according to the third embodiment is able to propel the vehicle with normal operation control. By so doing, the vehicle running control system 1 according to the third embodiment is able to improve a reflection of a driver's intention on running of the vehicle when the driver has operated the accelerator pedal 10.

Alternative Embodiments

Note that it is applicable that the vehicle running control systems 1 according to the first to third embodiments do not control the power source 20a but control the transmission 20b through driving force control when the accelerator pedal 10 has been quickly depressed or quickly released. In this case, the vehicle running control systems 1 change the details that the control unit 125 controls the transmission 20b on the basis of the result of determination made by the operation determination unit 124.

That is, the operation determination unit 124 sets the quick operation determination threshold on the basis of the operation information of the accelerator pedal 10, detected by the threshold setting unit 123, and determines whether the peak operating speed is higher than or equal to the set threshold. When the operation determination unit 124 determines that the driver has quickly operated the accelerator pedal 10, that is, the driver has quickly depressed or quickly released the accelerator pedal 10, the details of control over the transmission 20b by the control unit 125 are changed on the basis of the result of determination. When the operation determination unit 124 determines that the driver has quickly depressed or quickly released the accelerator pedal 10, the control unit 125, for example, shifts a gear selected for the transmission 20b into a gear that is lower in rotational speed than a gear selected in normal operation control. By so doing, the vehicle running control systems 1 are able to accelerate or decelerate the vehicle at a high rate in comparison with, for example, the vehicle in which the transmission 20b is controlled with normal operation control. That is, the vehicle running control systems 1 are able to further accurately reflect a driver's intention on running control over the vehicle in comparison with, for example, the vehicle running control system that is configured to control the transmission of the driving force generating device on the basis of only the operating speed of the accelerator pedal. That is, the vehicle running control systems 1 are able to improve a reflection of a driver's intention on running of the vehicle when the driver has operated the accelerator pedal 10.

In addition, the vehicle running control system 1 according to the aspect of the invention may be a combination of two or more of the vehicle running control systems 1 described in the first to third embodiments. For example, when the driver returns the accelerator pedal 10, the vehicle running control system 1 according to the aspect of the invention may execute the driving force control process described in the first embodiment or the driving force control process described in the second embodiment on the power source 20a on the basis of whether the accelerator position is higher than or equal to a set value (for example, accelerator position is 50%). By so doing, in the case of the above setting, when the accelerator position is higher than or equal to the set value, the operation determination unit 124 determines whether the driver has quickly released the accelerator pedal 10 by means of the control procedure described in the first embodiment. In contrast to this, when the accelerator position is lower than the set value, the operation determination unit 124 predicts that the driver releases the foot from the accelerator pedal 10 to fully close the accelerator pedal 10 and then determines that the accelerator pedal 10 is fully closed by means of the driving force control process described in the second embodiment. As described above, the operation determination unit 124 may determine the operation of the accelerator pedal 10, the control unit 125 may control power generated by the power source 20a on the basis of the result of determination made by the operation determination unit 124.

Incidentally, in the case where the driver quickly depresses the accelerator pedal 10 or quickly releases the accelerator pedal 10, even if a shock, such as vibration, somewhat occurs in the vehicle, the driver mostly intends to prompt quick response that is the response of the vehicle for quick operation of the accelerator pedal 10. Then, for example, when the operation determination unit 124 determines that the driver has quickly depressed or quickly released the accelerator pedal 10, the control unit 125 may change the details of control over the power source 20a so as to increase the response of power generated by the power source 20a. In this case, for example, in the case of the vehicle that decreases quick response so as to prevent shock, such as vibration, from occurring in the vehicle through normal operation control, when the operation determination unit 124 determines that the driver has quickly depressed or quickly released the accelerator pedal 10, the control unit 125 is able to increase quick response by allowing shock, such as vibration, to occur in the vehicle.

In addition, in the vehicle running control systems 1 according to the first to third embodiments, the accelerator operator is the accelerator pedal 10; however, the accelerator operator is not limited to the accelerator pedal 10. The accelerator operator may be an operator, such as a lever and a grip.

In addition, in the above described vehicle running control systems 1, a brake operator, such as a brake pedal, may be applied instead of the accelerator operator. In this case, the operation determination unit 124 determines whether the driver has quickly operated the brake operator, and the vehicle running control systems 1 are able to change the details that the control unit 125 controls a braking system equipped for the vehicle on the basis of the result of determination. For example, in the vehicle running control system 1 to which a brake pedal is applied instead of the accelerator operator, when the driver has quickly depressed the brake pedal, the control unit 125 is able to increase the rate of change of braking force of the vehicle, generated by the braking system, with respect to the rate of change of braking force of the vehicle in normal operation control. That is, the vehicle running control system 1 is able to further increase braking force of the vehicle when the driver has quickly depressed the brake pedal. In this way, the vehicle running control system 1 to which the brake operator is applied instead of the accelerator operator is able to change the details of control over the braking system on the basis of a driver's intention.

As described above, the vehicle running control system according to the aspect of the invention is useful as a vehicle running control system that improves a reflection of a driver's intention on running of the vehicle.

The invention claimed is:

1. A vehicle running control system that, at the time of controlling driving force, determines whether an operating speed that is a speed at which a driver operates an accelerator operator is higher than or equal to a threshold and that changes details of control over the driving force on the basis of a result of the determination, the vehicle running control system comprising:
a threshold setting unit that sets the threshold on the basis of operation information, other than the operating speed of the accelerator operator, within information related to operation of the accelerator operator; wherein
the operation information is a stroke amount that is an operation amount of the accelerator operator when the driver has operated the accelerator operator,
the threshold is set to be larger as the stroke amount increases, and
when determined that the operating speed is higher than or equal to the threshold, the details of control over the driving force are changed so that a rate of change of the driving force is increased as compared with a rate of change during normal times.

2. The vehicle running control system according to claim 1, wherein
the vehicle running control system calculates an absolute value of a difference between an operation amount at a start of operation of the accelerator operator and an operation amount at an end of operation of the accelerator operator as the stroke amount, and
the end of operation is time at which a predetermined period of time has elapsed after the operating speed becomes a maximum value.

3. The vehicle running control system according to claim 1, wherein
the vehicle running control system calculates an absolute value of a difference between an operation amount at a start of operation of the accelerator operator and an operation amount at an end of operation of the accelerator operator as the stroke amount, and
the end of operation is time at which the operating speed has decreased by a predetermined value from a maximum value of the operating speed.

4. The vehicle running control system according to claim 1, wherein the vehicle running control system determines whether the driver has released the accelerator operator with the operating speed higher than or equal to the threshold, and
the operation information is an accelerator position when the driver starts releasing the accelerator operator with the operating speed higher than or equal to the threshold.

5. The vehicle running control system according to claim 1, wherein
the operation information is information as to whether the driver has operated the accelerator operator from a fully closed state when the driver starts operating the accelerator operator, and wherein
the threshold setting unit is configured to increase the threshold when the driver has operated the accelerator operator from a fully closed state when the driver starts operating the accelerator operator.

6. The vehicle running control system according to claim 1, wherein
the vehicle running control system determines whether the driver has depressed the accelerator operator with the operating speed higher than or equal to the threshold, and determines whether the driver has released the accelerator operator with the operating speed higher than or equal to the threshold,
when the vehicle running control system determines that the driver has depressed the accelerator operator with the operating speed higher than or equal to the threshold, the details of control over the driving force are changed so that a target output value is increased with respect to a target output value during normal times, which is set in correspondence with the detected accelerator position, and
when it is determined that the driver has released the accelerator operator with the operating speed higher than or equal to the threshold, the details of control over the driving force are changed so that the target output value is decreased with respect to the target output value during normal times.

7. The vehicle running control system according to claim 1, wherein
when determined that the operating speed is higher than or equal to the threshold, an output value of the vehicle is increased.

8. The vehicle running control system according to claim 7, wherein said output value of the vehicle is one of a target acceleration, a target torque and a target driving force.

9. A vehicle running control method in which, at the time of controlling driving force, the vehicle running control method determines whether an operating speed that is a speed at which a driver operates an accelerator operator is higher than or equal to a threshold and that changes details of control over the driving force on the basis of a result of the determination, the vehicle running control method comprising:
setting the threshold on the basis of operation information, other than the operating speed of the accelerator operator, within information related to operation of the accelerator operator, the setting being performed by an electronic control unit; wherein
the operation information is a stroke amount that is an operation amount of the accelerator operator when the driver has operated the accelerator operator, said setting the threshold is performed by setting said threshold to be larger as the stroke amount increases, and the method further comprises changing, when the vehicle running control method determined that the operating speed is higher than or equal to the threshold, the details of control over the driving force so that a rate of change of the driving force is increased as compared with a rate of change during times at which the operating speed is lower than the threshold.

* * * * *